(12) United States Patent
Lussier et al.

(10) Patent No.: US 10,933,877 B2
(45) Date of Patent: Mar. 2, 2021

(54) TRACK DRIVE MODE MANAGEMENT SYSTEM AND METHODS

(71) Applicant: Camso Inc., Magog (CA)

(72) Inventors: Alain Lussier, St-Francois-Xavier-de-Brompton (CA); Francois Leblanc, Magog (CA); Patrice Boily, St-Catherine-de-Hatley (CA)

(73) Assignee: Camso Inc., Magog (CA)

( * ) Notice: Subject to any disclaimer, the term of this patent is extended or adjusted under 35 U.S.C. 154(b) by 344 days.

(21) Appl. No.: 15/958,156

(22) Filed: Apr. 20, 2018

(65) Prior Publication Data
US 2018/0237020 A1 Aug. 23, 2018

Related U.S. Application Data

(63) Continuation of application No. 14/665,075, filed on Mar. 23, 2015, now Pat. No. 9,975,554, which is a continuation of application No. 13/326,010, filed on Dec. 14, 2011, now Pat. No. 8,985,250.

(60) Provisional application No. 61/422,949, filed on Dec. 14, 2010.

(51) Int. Cl.
| | |
|---|---|
| *B60W 30/18* | (2012.01) |
| *B60W 40/10* | (2012.01) |
| *B60W 10/06* | (2006.01) |
| *B62D 55/30* | (2006.01) |
| *B62D 55/32* | (2006.01) |
| *B62D 55/24* | (2006.01) |

(Continued)

(52) U.S. Cl.
CPC ...... *B60W 30/18172* (2013.01); *B60W 10/06* (2013.01); *B60W 40/10* (2013.01); *B62D 11/003* (2013.01); *B62D 55/12* (2013.01); *B62D 55/244* (2013.01); *B62D 55/30* (2013.01); *B62D 55/32* (2013.01); *B60W 2300/17* (2013.01); *B60W 2300/44* (2013.01); *B60W 2510/105* (2013.01)

(58) Field of Classification Search
CPC ........... B60W 30/18172; B60W 40/10; B60W 2300/44; B60W 2510/105; B62D 11/003; B62D 55/12; B62D 55/244; B62D 55/30; B62D 55/32
USPC .................................. 305/143, 147; 180/197
See application file for complete search history.

(56) References Cited

U.S. PATENT DOCUMENTS

| | | |
|---|---|---|
| 2,040,696 A | 5/1936 | Johnston |
| 2,369,130 A | 2/1945 | Benson |
| 2,461,150 A | 2/1949 | Flynn et al. |

(Continued)

FOREIGN PATENT DOCUMENTS

| | | |
|---|---|---|
| CA | 2606039 | 4/2009 |
| CA | 2838935 | 1/2013 |

(Continued)

OTHER PUBLICATIONS

U.S. Appl. No. 13/495,823, filed Jun. 2012, Kautsch.

(Continued)

*Primary Examiner* — Tony H Winner
(74) *Attorney, Agent, or Firm* — Fish & Richardson P.C.

(57) ABSTRACT

A method for managing a drive mode of a tracked vehicle, comprising the step of reading an output of a sensor and in response to the output of the sensor performing a control action to manage the drive mode of the vehicle.

48 Claims, 7 Drawing Sheets

(51) Int. Cl.
*B62D 55/12* (2006.01)
*B62D 11/00* (2006.01)

(56) References Cited

U.S. PATENT DOCUMENTS

| | | |
|---|---|---|
| 2,523,182 A | 9/1950 | Battaglia |
| 2,562,264 A | 7/1951 | Ford |
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba et al. |
| 3,582,154 A | 1/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ, Sr. |
| 3,781,067 A | 12/1973 | Dodson et al. |
| 3,858,948 A | 1/1975 | Johnson et al. |
| 3,887,244 A | 6/1975 | Haslett et al. |
| 3,914,990 A | 10/1975 | Borg |
| 3,944,006 A | 3/1976 | Lassanske |
| 3,981,943 A | 9/1976 | Fujio et al. |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,482,364 A | 1/1996 | Edwards et al. |
| 5,498,188 A | 3/1996 | Deahr |
| 5,511,869 A | 4/1996 | Edwards et al. |
| 5,513,683 A | 5/1996 | Causa et al. |
| 5,529,267 A | 6/1996 | Giras |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Oertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | Ono |
| 6,176,557 B1 | 1/2001 | Ono |
| 6,186,604 B1 | 2/2001 | Fikse |
| 6,193,335 B1 | 2/2001 | Edwards |
| 6,206,492 B1 | 3/2001 | Moser |
| 6,224,172 B1 | 5/2001 | Goodwin |
| 6,241,327 B1 | 6/2001 | Gleasman et al. |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 | 5/2002 | Brandenburger |
| 6,386,654 B1 | 5/2002 | Singer et al. |
| 6,416,142 B1 | 7/2002 | Oertley |
| 6,474,756 B2 | 11/2002 | Hori et al. |
| 6,494,548 B2 | 12/2002 | Courtemanche |
| 6,536,852 B2 | 3/2003 | Katayama et al. |
| 6,536,853 B2 | 3/2003 | Katayama et al. |
| 6,568,769 B1 | 5/2003 | Watanabe et al. |
| 6,581,449 B1 | 6/2003 | Brown et al. |
| D476,599 S | 7/2003 | Whittington |
| 6,588,862 B1 | 7/2003 | Pringiers |
| 6,637,276 B2 | 10/2003 | Adderton et al. |
| 6,652,043 B2 | 11/2003 | Oertley |
| 6,671,609 B2 | 12/2003 | Nantz et al. |
| 6,698,850 B2 | 3/2004 | Ueno |
| D488,171 S | 4/2004 | Juncker et al. |
| 6,716,012 B2 | 4/2004 | Yovichin et al. |
| 6,733,091 B2 | 5/2004 | Deland et al. |
| 6,733,093 B2 | 5/2004 | Deland et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,874,586 B2 | 2/2005 | Ueno |
| D505,136 S | 5/2005 | Brazier |
| 6,904,986 B2 | 6/2005 | Brazier |
| 6,913,329 B1 | 7/2005 | Rodgers et al. |
| 6,921,197 B2 | 7/2005 | Aubel et al. |
| 6,923,515 B2 | 8/2005 | Konickson et al. |
| 6,932,442 B2 | 8/2005 | Hori |
| 6,935,708 B2 | 8/2005 | Courtemanche |
| 6,948,784 B2 | 9/2005 | Wodrich et al. |
| 6,962,222 B2 | 11/2005 | Kirihara |
| 6,964,462 B2 | 11/2005 | Katoh et al. |
| 6,974,196 B2 | 12/2005 | Gagne et al. |
| 7,001,294 B2 | 2/2006 | Fukuda |
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,197,922 B2 | 4/2007 | Rimkus et al. |
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,316,251 B2 | 1/2008 | Kogure et al. |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,416,266 B2 | 8/2008 | Soucy et al. |
| 7,497,530 B2 | 3/2009 | Bessette |
| 7,567,171 B2 | 7/2009 | Dufournier |
| 7,597,161 B2 | 10/2009 | Brazier |
| D603,880 S | 11/2009 | Brazier |
| 7,625,050 B2 | 12/2009 | Bair |
| 7,676,307 B2 | 3/2010 | Schmitt et al. |

(56) References Cited

U.S. PATENT DOCUMENTS

| | | | |
|---|---|---|---|
| 7,708,092 B2 | 5/2010 | Despres |
| 7,729,823 B2 | 6/2010 | Ruoppolo |
| 7,740,094 B2 | 6/2010 | Pelletier |
| 7,798,260 B2 | 6/2010 | Albright et al. |
| 7,778,741 B2 | 8/2010 | Rao et al. |
| 7,779,947 B2 | 8/2010 | Stratton |
| 7,784,884 B2 | 8/2010 | Soucy et al. |
| 7,823,987 B2 | 11/2010 | Dandurand et al. |
| 7,866,766 B2 | 1/2011 | Berg |
| 7,914,088 B2 | 3/2011 | Bair |
| 7,914,089 B2 | 3/2011 | Bair |
| D644,670 S | 9/2011 | Barrelmeyer |
| 8,122,581 B1 | 2/2012 | Hurst et al. |
| 8,327,960 B2 | 12/2012 | Couture et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aube |
| D683,769 S | 6/2013 | Aube |
| 8,567,876 B2 | 10/2013 | Wellman |
| 8,628,152 B2 | 1/2014 | Delisle et al. |
| 8,736,147 B1 * | 5/2014 | Wang ............... H01L 41/113 310/339 |
| D711,928 S | 8/2014 | Brazier |
| 8,985,250 B1 | 3/2015 | Lussier et al. |
| 9,033,431 B1 | 5/2015 | Zuchoski et al. |
| 9,067,631 B1 | 6/2015 | Lussier et al. |
| 9,334,001 B2 | 5/2016 | Lussier et al. |
| 9,855,843 B2 | 1/2018 | Vik et al. |
| 9,880,075 B2 | 1/2018 | Finch et al. |
| 9,975,554 B2 | 5/2018 | Lussier et al. |
| 10,006,836 B2 | 6/2018 | Monty et al. |
| 10,272,959 B2 | 4/2019 | Zuchoski et al. |
| 10,328,982 B2 | 6/2019 | Lussier et al. |
| 2002/0070607 A1 | 6/2002 | Edwards |
| 2002/0140288 A1 | 10/2002 | Herberger et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Kazutoshi |
| 2003/0080618 A1 | 5/2003 | Krishnan et al. |
| 2003/0089534 A1 | 5/2003 | Kanzler et al. |
| 2004/0004395 A1 | 1/2004 | Soucy et al. |
| 2004/0070273 A1 | 4/2004 | Safe et al. |
| 2004/0084962 A1 | 5/2004 | Soucy et al. |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0090558 A1 | 5/2006 | Raskas |
| 2006/0103236 A1 | 5/2006 | Soucy et al. |
| 2006/0124366 A1 | 6/2006 | LeMasne De Chermont |
| 2006/0144480 A1 | 7/2006 | Takayama |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1 | 4/2008 | Rainer |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0195062 A1 | 8/2009 | Uchida |
| 2009/0302676 A1 | 12/2009 | Brazier |
| 2009/0302677 A1 | 12/2009 | Sugihara |
| 2009/0309415 A1 | 12/2009 | Shimozono |
| 2009/0326109 A1 | 12/2009 | Kameda et al. |
| 2010/0012399 A1 | 1/2010 | Hansen |
| 2010/0033010 A1 | 2/2010 | Shimozono |
| 2010/0079238 A1 * | 4/2010 | Gravelle ............ G06K 19/0707 340/5.8 |
| 2010/0095506 A1 | 4/2010 | Bair |
| 2010/0096915 A1 | 4/2010 | Hagio |
| 2010/0096917 A1 | 4/2010 | Bair |
| 2010/0121644 A1 | 5/2010 | Wellman |
| 2010/0133019 A1 | 6/2010 | Muemken |
| 2010/0139994 A1 | 6/2010 | Hansen |
| 2010/0191417 A1 | 7/2010 | Murahashi et al. |
| 2010/0194553 A1 | 8/2010 | Mizutani et al. |
| 2010/0230185 A1 | 9/2010 | Mallette et al. |
| 2010/0253138 A1 | 10/2010 | Despres |
| 2010/0256946 A1 | 10/2010 | Carresjö et al. |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |
| 2012/0242143 A1 | 9/2012 | Feldmann |
| 2012/0253590 A1 | 10/2012 | Fink |
| 2012/0306916 A1 | 12/2012 | Marumoto |
| 2013/0033271 A1 | 2/2013 | Woodard |
| 2013/0073157 A1 | 3/2013 | Person et al. |
| 2013/0082846 A1 | 4/2013 | McKinley et al. |
| 2013/0126196 A1 | 5/2013 | Rosenboom |
| 2013/0134772 A1 | 5/2013 | Dandurand et al. |
| 2013/0134773 A1 | 5/2013 | Dandurand et al. |
| 2013/0162016 A1 | 6/2013 | Lajoie et al. |
| 2013/0245911 A1 | 9/2013 | Nakajima et al. |
| 2013/0255354 A1 | 10/2013 | Hawkins et al. |
| 2013/0325266 A1 | 12/2013 | Padilla et al. |
| 2014/0105481 A1 | 4/2014 | Hasselbusch et al. |
| 2014/0125117 A1 | 5/2014 | Weeks et al. |
| 2014/0180534 A1 | 6/2014 | Son |
| 2014/0182960 A1 | 7/2014 | Bedard et al. |
| 2014/0288763 A1 | 9/2014 | Bennett et al. |
| 2014/0324301 A1 | 10/2014 | Rebinsky |
| 2015/0042152 A1 | 2/2015 | Lussier et al. |
| 2015/0042153 A1 | 2/2015 | Lussier et al. |
| 2015/0107975 A1 * | 4/2015 | Chen ..................... H01H 13/83 200/5 A |
| 2015/0191173 A1 | 7/2015 | Lussier et al. |
| 2016/0059779 A1 | 3/2016 | Vandendriessche |
| 2016/0121945 A1 | 5/2016 | Rust et al. |
| 2016/0332682 A1 | 11/2016 | Lussier et al. |
| 2017/0087987 A1 | 3/2017 | Vik et al. |
| 2017/0174277 A1 | 6/2017 | Zuchoski et al. |
| 2017/0177011 A1 | 6/2017 | Garvin et al. |
| 2018/0043949 A1 | 2/2018 | Boily |
| 2018/0093724 A1 | 4/2018 | Boily |
| 2018/0172556 A1 | 6/2018 | Piovan et al. |
| 2018/1900450 | 7/2018 | Richard et al. |
| 2018/0265145 A1 * | 9/2018 | Todd ..................... G07C 5/085 |
| 2018/0364744 A1 | 12/2018 | Garvin et al. |
| 2019/0351957 A1 | 11/2019 | Zuchoski et al. |

FOREIGN PATENT DOCUMENTS

| | | |
|---|---|---|
| CA | 2947575 | 5/2017 |
| DE | 20207342 U1 | 8/2002 |
| EP | 0578504 A2 | 1/1994 |

(56) References Cited

FOREIGN PATENT DOCUMENTS

| EP | 1008509 | | 6/2000 |
|---|---|---|---|
| EP | 1211169 | | 5/2002 |
| EP | 1260429 | A2 | 11/2002 |
| EP | 1273504 | A1 | 1/2003 |
| EP | 1283152 | A1 | 2/2003 |
| EP | 1325820 | B1 | 9/2004 |
| EP | 1506913 | | 2/2005 |
| EP | 1882627 | A1 | 1/2008 |
| EP | 1953070 | | 8/2008 |
| EP | 2014542 | | 1/2009 |
| EP | 2119620 | | 11/2009 |
| EP | 3313717 | | 8/2018 |
| GB | 2229410 | | 9/1990 |
| JP | 02074476 | A | 3/1990 |
| JP | 11129946 | A | 5/1999 |
| JP | 2000053037 | A | 2/2000 |
| JP | 2003011860 | A | 1/2003 |
| JP | 2003089366 | | 3/2003 |
| JP | 2004330830 | | 11/2004 |
| JP | 2006103482 | | 4/2006 |
| JP | 2007022304 | | 2/2007 |
| JP | 2009061829 | | 3/2009 |
| JP | 2009248924 | | 10/2009 |
| JP | 2010018091 | | 1/2010 |
| JP | 2010047040 | | 3/2010 |
| JP | 2010089729 | | 4/2010 |
| KR | 20120055071 | | 5/2012 |
| SU | 01446017 | A2 | 12/1988 |
| WO | 2008108439 | A1 | 9/2008 |
| WO | 2009105892 | A1 | 9/2009 |
| WO | 2009106617 | A1 | 9/2009 |
| WO | WO2013002781 | | 1/2013 |
| WO | 2014056089 | | 4/2014 |
| WO | WO2014168851 | | 10/2014 |
| WO | 2016138592 | | 9/2016 |
| WO | 2017000068 | | 1/2018 |
| WO | WO2019109191 | | 6/2019 |
| WO | WO2020041897 | | 3/2020 |
| WO | WO2020041899 | | 3/2020 |

OTHER PUBLICATIONS

U.S. Appl. No. 61/808,148, filed Apr. 2013, de Boe et al.
International Search Report & Written Opinion dated Sep. 29, 2016 in connection with PCT/CA2016/050760, 8 pages.
Restriction Requirement dated Jan. 27, 2014 in connection with U.S. Appl. No. 13/326,010, 5 pages.
Non-Final Office Action dated Jun. 2, 2014 in connection with U.S. Appl. No. 13/326,010, 6 pages.
Notice of Allowance dated Nov. 14, 2014 in connection with U.S. Appl. No. 13/326,010, 7 pages.
Office Action dated Apr. 5, 2016 in connection with U.S. Appl. No. 14/665,075, 5 pages.
Office Action dated Jan. 12, 2017 in connection with U.S. Appl. No. 14/665,075, 11 pages.
Office Action dated Jun. 12, 2017 in connection with U.S. Appl. No. 14/665,075, 9 pages.
Office Action dated Oct. 11, 2017 in connection with U.S. Appl. No. 14/665,075, 6 pages.
Restriction Requirement dated Jun. 9, 2014 in connection with U.S. Appl. No. 13/326,278, 7 pages.
Non-Final Office Action dated Mar. 6, 2015 in connection with U.S. Appl. No. 13/326,278, 16 pages.
Final Office Action dated Jun. 26, 2015 in connection with U.S. Appl. No. 13/326,278, 15 pages.
Notice of Allowance dated Jan. 11, 2016 in connection with U.S. Appl. No. 13/326,278, 7 pages.
Examiner's Report dated Jan. 11, 2018 in connection with Canadian Patent Application No. 2,978,482, 3 pages.
Examiner's Report dated Feb. 1, 2018 in connection with Canadian Patent Application No. 2,991,072, 3 pages.

Non-Final Office Action dated Dec. 1, 2016 in connection with U.S. Appl. No. 15/139,572, 5 pages.
Final Office Action dated Sep. 8, 2017 in connection with U.S. Appl. No. 15/139,572, 14 pages.
Non-Final Office Action dated May 17, 2018 in connection with U.S. Appl. No. 15/454,881, 8 pages.
Notice of Allowance dated May 30, 2018 in connection with U.S. Appl. No. 15/139,572, 10 pages.
Examiner's report dated Aug. 28, 2018 in connection with Canadian Patent application No. 2,991,072, 4 pages.
Office Action dated Sep. 11, 2018 in connection with U.S. Appl. No. 15/139,572, 7 pages.
Final Office Action dated Aug. 24, 2018 in connection with U.S. Appl. No. 15/454,881, 30 pages.
Interview Summary dated Nov. 2, 2018 in connection with U.S. Appl. No. 15/454,881, 3 pages.
Notice of Allowance dated Dec. 17, 2018 in connection with U.S. Appl. No. 15/454,881, 5 pages.
Interview Summary dated Dec. 10, 2018 in connection with U.S. Appl. No. 15/139,572, 3 pages.
Supplementary Search Report dated Jan. 2, 2019 in connection with the European Patent Application No. 16816886, 1 page.
Non-Final Office Action dated Apr. 9, 2019 in connection with U.S. Appl. No. 15/724,733, 56 pages.
Communication pursuant to Article 94 (3) EPC dated Aug. 22, 2019 in connection with European Patent Application No. 16816886.2-1013, 4 pages.
Final Office Action dated Aug. 19, 2019 in connection with U.S. Appl. No. 15/724,733, 18 pages.
International Search Report and Written Opinion dated Oct. 29, 2019 in connection with International PCT Application No. PCT/CA2019/051219, 9 pages.
International Search Report and Written Opinion dated Nov. 12, 2019 in connection with International PCT Application No. PCT/CA2019/051217, 8 pages.
Non-Final Office Action dated Dec. 30, 2019 in connection with U.S. Appl. No. 15/740,976, 16 pages.
Non-Final Office Action dated Mar. 20, 2018 in connection with U.S. Appl. No. 15/139,572, 7 pages.
Restriction Requirement dated Oct. 25, 2019 in connection with U.S. Appl. No. 15/555,148, 7 pages.
Office Action dated Jan. 24, 2020 in connection with U.S. Appl. No. 15/555,148, 57 pages.
Communication under Rule 71(3) EPC dated Mar. 16, 2020 in connection with European Patent Application 16758408.5, 7 pages.
Communication under Rule 71(3) EPC dated May 5, 2020 in connection with European Patent Application No. 16816886.2, 113 pages.
Ex Parte Quayle dated Sep. 11, 2018, in connection with U.S. Appl. No. 15/139,572, 7 pages.
Notice of Allowance dated May 20, 2020 in connection with U.S. Appl. No. 15/740,976, 12 pages.
Final Office Action dated Jul. 6, 2020, in connection with U.S. Appl. No. 15/555,148, 20 pages.
Notice of Allowance dated Apr. 2, 2020 in connection with U.S. Appl. No. 15/724,733, 5 pages.
Bair Products, Inc. "Larry Lugs—Patented Bolt-On-Replacement Drive Lugs", http://www.bairproductsinc.com/products/larry_lugs.html, Jan. 1, 2011, 2 pages.
Bridgestone Industrial Products America Inc. "Stay on the Right Track. New Generation Features Rubber Tracks for Excavators", Brochure 2009, 12 pages.
Bridgestone Industrial Products America Inc., "Stay on the Right Track. Rubber Tracks for Track Loaders", Brochure 2009, 6 pages.
Camoplast Inc. "ATV/UTV Track Systems", 2009-2010 Catalog, 8 pages.
CAN-AM BRP, "Parts & Accessories—Track Systems", Parts, Accessories & Riding Gear Catalogue, p. 66 (2011).
Red Roo Solutions Pty Ltd—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pages.

(56) References Cited

OTHER PUBLICATIONS

Story by Staff, BRP upgrades Apache ATV track system for Outlander—Apache system features larger footprint and power steering mode, atv.com, http://www.atc.com/news/brp-upgrades-apache-atv-track-system-for-outlander-1481.html 2 pages (Nov. 24, 2009).
Examiner's report dated Jan. 16, 2019 in connection with Canadian Patent Application No. 2,991,072, 3 pages.
Extended European Search Report dated Jan. 9, 2019 in connection with European Patent Application No. 16816886.2, 7 pages.
Extended European Search Report and Written Opinion dated Sep. 13, 2013 in connection, with European Patent Application No. 10835318.6, 8 pages.
Extended European Search Report dated Mar. 20, 2019 in connection with European Patent Application No. 16758408.5, 8 pages.
Final Office Action dated Mar. 5, 2015 in connection with U.S. Appl. No. 13/325,796, 33 pages.
International Search Report dated Mar. 5, 2019 in connection with International PCT application No. PCT/CA2018/051567, 4 pages.
Interview Summary Report dated Sep. 12, 2015 in connection with U.S. Appl. No. 13/326,278, 3 pages.
Non-Final Office Action dated Feb. 21, 2017 in connection with U.S. Appl. No. 14/721,326, 12 pages.
Non-Final Office Action dated Jan. 11, 2017 in connection with U.S. Appl. No. 14/886,327, 11 pages.
Non-Final Office Action dated Jul. 10, 2014 in connection with U.S. Appl. No. 13/424,459, 11 pages.
Non-Final Office Action dated Jul. 14, 2014 in connection with U.S. Appl. No. 13/112,840, 16 pages.
Non-Final Office Action dated Sep. 22, 2014 in connection with U.S. Appl. No. 13/325,796, 25 pages.
Non-Final Office Action dated Sep. 29, 2014 in connection with U.S. Appl. No. 13/325,783, 27 pages.
Notice of Allowance dated Feb. 15, 2019 in connection with U.S. Appl. No. 15/139,572, 1 pages.
Notice of Allowance dated Jan. 19, 2018 in connection with U.S. Appl. No. 14/665,075, 8 pages.
Notice of Allowance dated Mar. 4, 2015 in connection with U.S. Appl. No. 13/325,783, 13 pages.
Office Action dated Nov. 9, 2012, in connection with U.S. Appl. No. 29/405,414, 9 pages.
Office Action dated Nov. 9, 2012, in connection with U.S. Appl. No. 29/405,416, 9 pages.
Office Action dated Nov. 9, 2012, in connection with U.S. Appl. No. 29/405,417, 10 pages.
Restriction Requirement dated Sep. 26, 2013 in connection with U.S. Appl. No. 13/326,010, 6 pages.
Written Opinion dated Mar. 5, 2019 in connection with International PCT application No. PCT/CA2018/051567, 6 pages.
Communication pursuant to Rule 63(1) EPC dated Nov. 8, 2018 in connection with European Patent Application No. 16758408.5, 4 pages.
Final Office Action dated Dec. 23, 2014 in connection with U.S. Appl. No. 13/326,132, 15 pages.
Final Office Action dated Dec. 31, 2015 in connection with U.S. Appl. No. 13/326,132, 15 pages.
Final Office Action dated Mar. 27, 2014 in connection with U.S. Appl. No. 13/170,753, 16 pages.
Non-Final Office Action dated Jul. 10, 2014 in connection with U.S. Appl. No. 13/326,110, 16 pages.
Non-Final Office Action dated Jun. 24, 2015 in connection with U.S. Appl. No. 13/326,132, 17 pages.
Non-Final Office Action dated Oct. 2, 2013 in connection with U.S. Appl. No. 13/170,753, 15 pages.
Notice of Allowance dated Jan. 21, 2015 in connection with U.S. Appl. No. 13/326,110, 6 pages.
Notice of Allowance dated Oct. 24, 2014 in connection with U.S. Appl. No. 13/170,753, 5 pages.

* cited by examiner

TRACK DRIVE MODE MANAGEMENT SYSTEM AND METHODS

CROSS-REFERENCE TO RELATED APPLICATIONS

This application is a continuation application of and claims priority to U.S. application Ser. No. 14/665,075 filed on Mar. 23, 2015 (now U.S. Pat. No. 9,975,554), which is a continuation application of U.S. application Ser. No. 13/326,010 filed on Dec. 14, 2011 (now U.S. Pat. No. 8,985,250), which claims the benefit under 35 USC 119(e) of U.S. Provisional Patent Application No. 61/422,949 filed on Dec. 14, 2010. Each application is hereby incorporated by reference herein.

FIELD OF THE INVENTION

The present invention relates to tracked vehicles in general and in particular to improvements to tracked vehicles for reducing wear on the track. Specifically, the invention relates to methods for managing the drive mode of a tracked vehicle, systems for implementing those methods and individual components of such systems.

BACKGROUND OF THE INVENTION

Tracked vehicles, such as heavy agricultural or construction equipment, that routinely operate in rough environments may suffer from rapid track wear. As a result of this track wear, the track must be replaced often which is expensive and significantly increases the cost of operation of the vehicle over time.

Tracks, especially elastomeric tracks are subjected in use to different wear patterns that depend largely on the intensity and the type of use of the vehicle. One specific point of failure of the elastomeric track is the drive lugs. The drive lugs are used to establish a positive drive connection between the track and the drive sprocket. Accordingly, when the track operates at high loading levels, a significant amount of stress is exerted on the drive lugs to impart movement to the track. Over time, this amount of stress can damage the drive lugs ultimately leading to drive lug separation from the track carcass.

SUMMARY OF THE INVENTION

As embodied and broadly described herein the invention provides a method for controlling a drive mode of a vehicle having an engine and a track to propel the vehicle on the ground, the track capable of being driven by the engine in a plurality of drive modes including a friction drive mode and a positive drive mode. The method includes:
  a) providing a sensor on the vehicle, the sensor generating an output signal conveying information on a current drive mode of the track;
  b) providing a data processing apparatus including a machine readable storage encoded with drive mode control software for execution by a CPU;
  c) processing the information output by the sensor with the software to compute a desired track drive mode and generating a drive mode control signal;
  d) implementing the desired track drive mode in response to the drive mode control signal.

As embodied and broadly described herein the invention also encompasses a vehicle, having:
  a) an engine;
  b) an undercarriage including a track for propelling the vehicle;
  c) a drive line coupling the engine to the track, the driveline capable of driving the track in a plurality of drive modes, the plurality of drive modes including a friction drive mode and a positive drive mode;
  d) a sensor outputting a signal that conveys information allowing to establish the current drive mode of the track.

As embodied and broadly described herein the invention further provides an endless track for a vehicle, having a body having an outer ground engaging side and an inner side opposite to the ground engaging side. The track also includes a sensor for sensing a magnitude of force applied by a drive wheel to the track to drive the track.

As embodied and broadly described herein, the invention yet provides a sprocket for driving a endless track of a vehicle, the sprocket including a sensor for sensing a magnitude of force applied by the sprocket to the track.

As embodied and broadly described herein, the invention also includes an undercarriage having an endless track, a sprocket for driving the endless track and a sensor for measuring a magnitude of force applied by the sprocket to the endless track when the sprocket drives the track.

As embodied and broadly described herein, the invention further provides a method for operating a vehicle having an engine and an undercarriage, the undercarriage including:
  a) an endless track;
  b) wheels supporting the endless track, the engine being in a driving relationship with the track to propel the vehicle on the ground;
  c) a tensioning system for controlling a tension of the track, the method comprising:
    i) determining an operational parameter of the vehicle;
    ii) establishing on the basis of the measured operational parameter if the track tension needs adjusting;
    iii) operating the tensioning system while the vehicle is in motion to adjust the track tension on the basis of the establishing.

As embodied and broadly described herein, the invention yet provides a vehicle having an engine and an undercarriage, the undercarriage including:
  a) an endless track;
  b) wheels supporting the endless track, the engine being in a driving relationship with the track to propel the vehicle on the ground;
  c) a tensioning system for controlling a tension of the track;
  d) a sensor for sensing an operational parameter of the vehicle;
  e) a data processing apparatus including a CPU and a memory encoded with software for execution by the CPU, the software processing data indicative of the operational parameter to compute a tensioning system control signal;
  f) the tensioning system being responsive to the tensioning system control signal to alter the track tension while the vehicle is in motion.

As embodied and broadly described herein, the invention also provides a vehicle having an engine and an undercarriage, the undercarriage including:
  a) a first endless track on a first side of the undercarriage;
  b) a second endless track on a second side of the undercarriage opposite to the first side;

c) the first and second endless track being capable of being driven in a plurality of different modes which include a positive drive mode and a friction drive mode;

d) a control system for regulating the drive mode of the first track independently from the drive mode of the second track.

BRIEF DESCRIPTION OF THE DRAWINGS

A detailed description of examples of implementation of the present invention is provided hereinbelow with reference to the following drawings, in which.

Figure 1A:
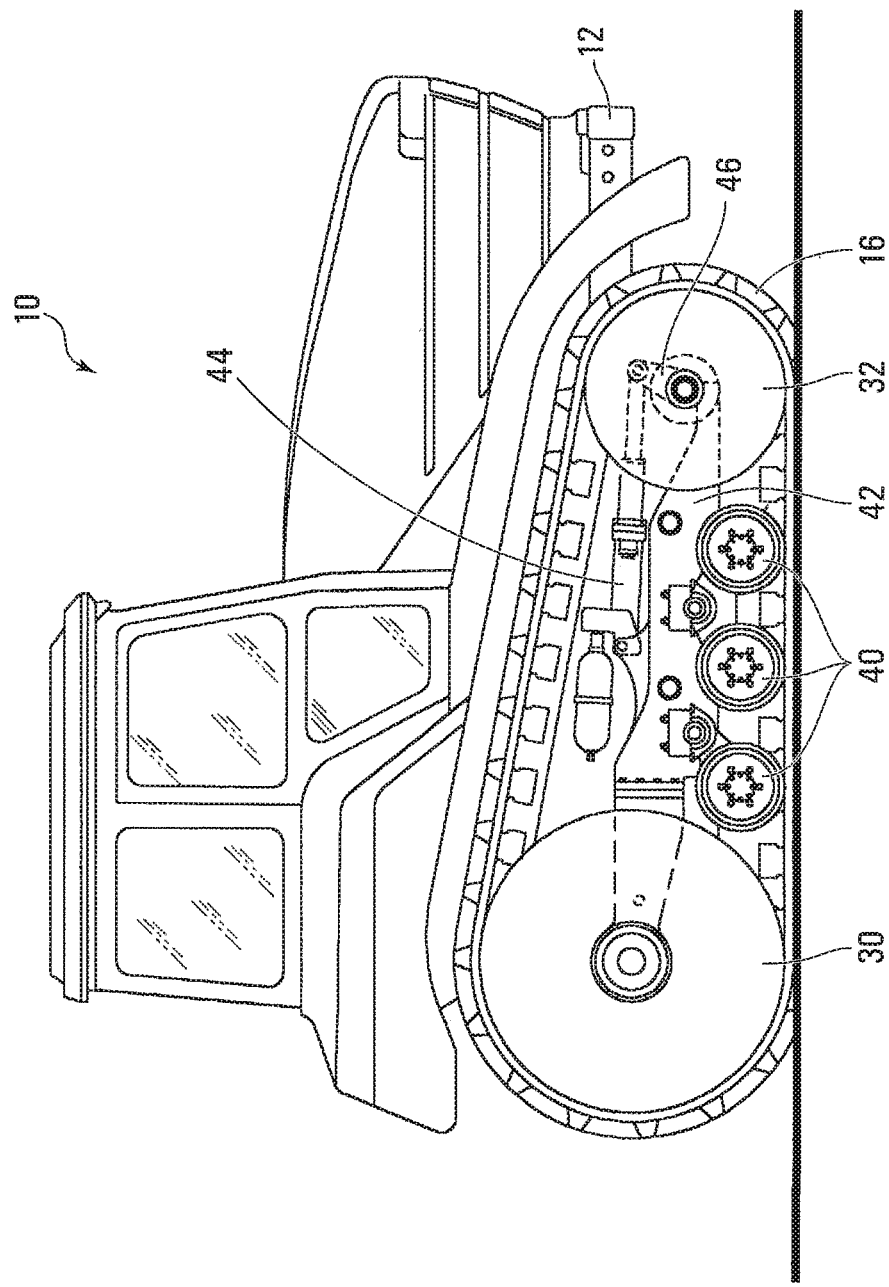
FIG. 1a is a side elevational view of an agricultural vehicle using a elastomeric track.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a side elevational view of an agricultural vehicle which uses a elastomeric track. The vehicle 10 has an upper body including a cabin for the operator and housing for the engine, which can be an internal combustion engine. Alternatively, the engine can include an electric motor powered by a suitable battery. The vehicle 10 also includes a drive-train coupled to the engine. The drive train includes the various components between the engine and the track driving sprockets, such as a gearbox, clutches and axles for imparting movement to the track.

The vehicle 10 has an undercarriage 12 including a set of wheels about which is tensioned a track 16. The set of wheels has a drive sprocket 30 and an idler wheel 32. In a variant, both wheels 30, 32 can be driven. The track 16 is mounted on the wheels 30, 32 such that as the wheels 30, 32 turn the track 16 is caused to move. The undercarriage 12 also includes a set of mid-rollers 40 which are mounted between the wheels 30, 32 in order to keep the run of the track 16 between the wheels 30, 32 in contact with the ground. The mid-rollers 40 are mounted on a suspension system 42 allowing the mid-rollers 40 to yield upwardly when the vehicle 10 rides over obstacles.

The undercarriage 12 further includes a tensioning system to tension the track 16. In a specific and non-limiting example of implementation the tensioning system operates hydraulically, however other possibilities exist without departing from the spirit of the invention. For instance, the tensioning system may be mechanical in nature and may use mechanical components, such as cables levers, pulleys or springs to vary the pressure on the track 16. The system can also be electrical and use electrical actuators to vary the track tension.

The tensioning system illustrated in the drawings operates hydraulically and includes a hydraulic ram 44 mounted between a fixed portion of the undercarriage and short arm 46 to which the wheel 32 is pivotally connected. As the piston 34 of the hydraulic ram 44 extends, this causes the short arm 46 to pivot clockwise and change the position of the wheel 32 with relation to the wheel 30. If the piston 34 is extended, the wheel 32 will thus move further away from the wheel 30, thus increasing the tension in the track 16. Conversely, if the piston 34 is retracted, the opposite effect takes place and the tension in the track 16 diminishes.

Figure 1B:
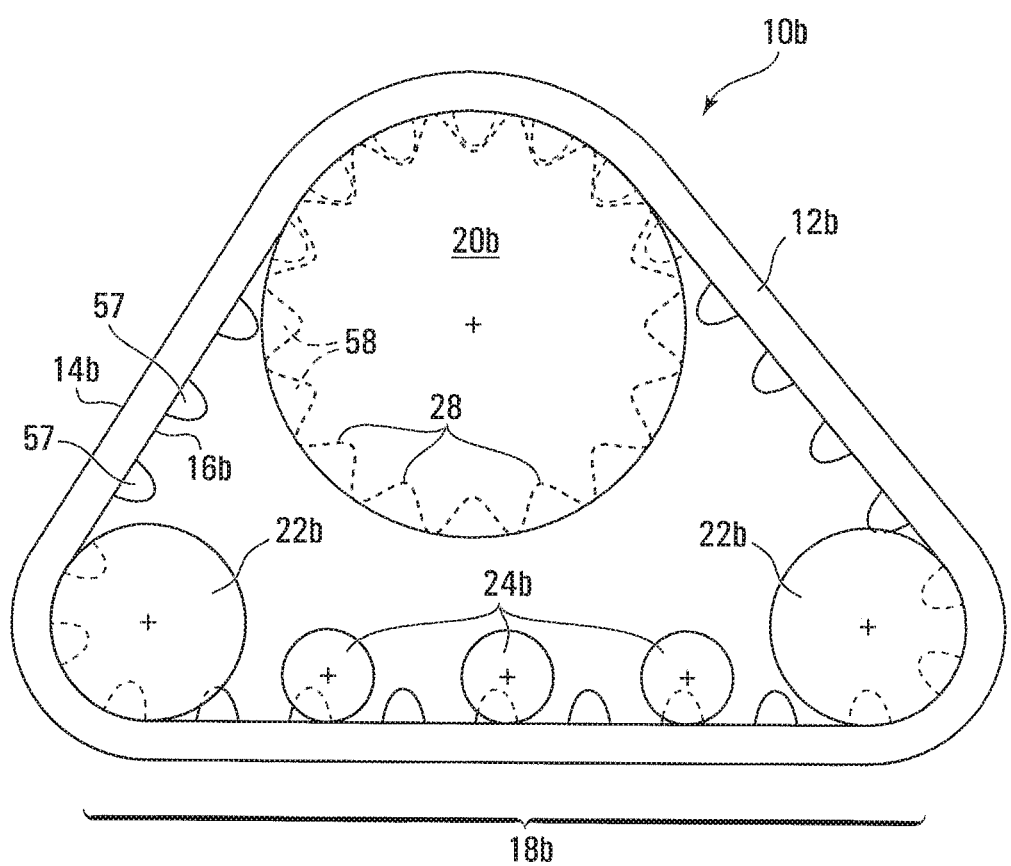
FIG. 1b is an alternative drive arrangement for an agricultural vehicle.

FIG. 1b illustrates an alternative track arrangement. FIG. 1b is a side view of an undercarriage that can be used to support and propel an agricultural or a construction vehicle and which is of a type that mounts to a drive axle; in practice a vehicle would normally require at least two of those undercarriages at the rear end, which is the drive end, and two front wheels to support the front end of the vehicle. Alternatively, the two front wheels can also be replaced by tracked undercarriages as well, in which case the vehicle will be supported on its four corners by tracks.

The undercarriage 10b includes the necessary mechanical components to run a track 12b. The track 12b has an outer ground engaging surface 14b and an opposite inner surface 16b. The width of the track 12b can vary according to the specific vehicle application.

The track 12b is supported by a series of wheels that define a generally triangular track path. That path has a lower run 18b which is a ground engaging run. When the vehicle is being driven it is supported on the ground engaging run 18b.

The series of wheels that support the track 12b include a drive sprocket 20b which is mounted on top, two generally opposite idler wheels 22b and a series of mid-rollers 24b mounted between the idler wheels 22b. The mid-rollers 24b engage the inner surface of the ground engaging run to maintain the ground engaging run 18b in contact with the ground during the operation of the vehicle and also to at least partially carry the vehicle weight. The mid-rollers 24b are mounted on a suspension system (not shown) allowing the mid-rollers 24b to yield upwardly when the vehicle rides over obstacles. Also, the undercarriage 10b is provided with a suitable track tensioning assembly that uses hydraulic pressure to maintain the desired tension in the track 12b. For convenience and clarity this track tensioning system has not been shown in FIG. 1b, it being understood that it is generally similar to the track tensioning system discussed in connection with the undercarriage example illustrated in FIG. 1a.

The drive sprocket 20b is coupled to an axle of the vehicle. The axle turns at a speed selected by the operator of the vehicle.

Figure 2:
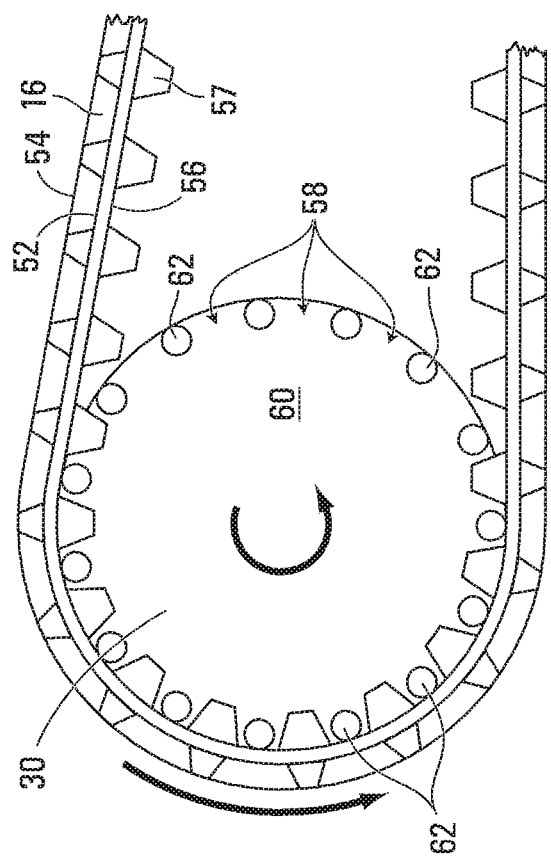
FIG. 2 is a side view of a sprocket used for driving a elastomeric track, showing the relationship between the drive lugs of the track and sprocket bars.

FIG. 2 illustrates in greater detail the mechanical relationship between the track 16 and the sprocket 30, it being understood that the arrangement shown in FIG. 1b operates is a similar manner. The sprocket 30 engages drive lugs 57 on the track 16. Specifically, the track 16 has a carcass 52 having an outer face 54 and an inner face 56. Drive lugs 57 are mounted to the inner face 56. The drive lugs 57 are made from elastomeric material and are located at equally spaced intervals from one another. The drive lugs 57 fit in respective sockets 58 formed on the periphery of the sprocket 30. The dimensions of the sockets 58 and their spacing matches those of the drive lugs 57, such that as the sprocket 30 turns the drive lugs 57 mesh with the respective sockets 58.

The sprocket 30 that is shown in FIG. 2, includes a central disk like structure 60 from which axially project a series of pins 62 defining between them the sockets 58. The sprocket 30 has two series of pins 62 one on each side of the disk like structure 60. This arrangement allows using on the track 16 two series of drive lugs 57, each series meshing with a respective set of pins 62.

Figure 3:
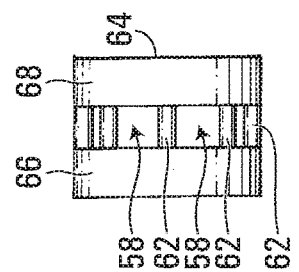
FIG. 3 is a front elevational view of an alternative sprocket configuration with the cavities for receiving the drive lugs of the track in the center of the sprocket.

An alternative arrangement is shown in FIG. 3, which illustrates a front view of a sprocket 64, where the sockets 58 are formed in the center of the sprocket 64. In this arrangement the track 16 (not shown) has a single row of drive lugs 57, which are centrally located and mesh with the sockets 58. In this form of construction, the sprocket 64 includes a pair of disks 66, 68 that are spaced apart and connected to one another via the pins 62 which define between them the sockets 58.

The sprocket 60, 64 can transmit motion to the track 16 by two different mechanisms. The first is the friction drive mode and the second is the positive drive mode. In the case of the sprocket 64, during the friction drive mode, the friction developed between the peripheral surfaces of the discs 66, 68 and the flat inner surface of the track, which engages those peripheral surfaces can be is sufficient to drive the track. The tension which is built in the track 16 by operation of the hydraulic tensioning system can produce a significant amount of friction which is sufficient to drive the track 16 in certain conditions During the friction drive mode, the drive lugs 57 mesh with the sockets 58 but there is little strain applied on drive lugs 57.

Beyond a certain degree of power loading, the friction drive mode transitions to the positive drive mode. The reaction force acting on the track 16 as the vehicle 10 moves can overcome the friction between the track 16 and the peripheral surfaces of the discs 66, 68. This produces a small degree of slip between the peripheral surfaces of the discs 66, 68 until the drive lugs firmly engage the pins 62. At that point no further slip is possible and the driving force is communicated to the track mostly via the drive lugs 57.

Figure 4A:
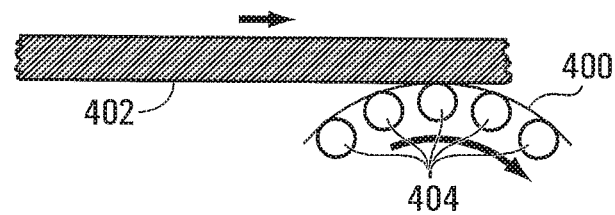
FIG. 4A is a fragmentary side view of a sprocket and a track illustrating a drive mode sensor according to a non-limiting example of implementation of the invention.

A drive mode sensor can be used to determine when the track 16 transitions from the friction drive mode to the positive drive mode. FIG. 4A is a simplified illustration of an example of implementation of the drive mode sensor that works by detecting slippage between the sprocket 60, 64 and the track 16. Slippage is indicative of an impending transition from the friction drive mode to the positive drive mode. In FIG. 4A, the peripheral surface of the sprocket 60, 64 driving the track is identified by 400. This peripheral surface 400 is in rolling contact with the portion of internal surface of the track 402 that is smooth surfaced, as the track moves. The sprocket 60, 64 is provided with a drive mode sensor having a series of sensing elements 404. Each sensing element 404 includes a roller that can turn about its pivot axis. Each roller is positioned such that its peripheral surface is generally flush with the peripheral surface 400. Each sensing element 404 is connected to a digital encoder or to any other signal generator that issues a signal when the sensing element 404 undergoes a certain angular displacement. The degree or displacement necessary to cause generation of a signal can vary; it can be as little a fraction of a degree or as much as a quarter of a turn.

When the track 16 is in the friction drive mode there is no relative movement between the inner surface 402 of the track and the surface 400. Accordingly, as the sprocket 60, 64 turns, the sensing elements 404 repeatedly come in contact with the inner surface 402 but they are not subjected to any rotation, hence no signal is produced. However, if a slip occurs, which as indicated previously may indicate the transition to the positive drive mode, that slip will cause one or more of the sensing elements 404 to turn and produce a detectable output signal.

Advantageously, the signal is communicated over a wireless link to a receiver mounted on the undercarriage or at any other convenient location. The drive mode sensor may be provided with a suitable power source, such as a battery mounted on the sprocket to supply electrical energy to the individual sensing elements and to the wireless transmitter. Optionally, a slip ring can be used to communicate the signal generated by the drive mode sensor, when a hard wired system is deemed more appropriate.

In specific implementation, the drive mode sensor is designed such that each sensing element 404 reports to the receiver individually. In this fashion, the receiver can monitor the angular position of each sensing element 404 independently. This feature allows comparing the various readings from the sensing elements 404 to confirm that indeed a slip has occurred. Since at any given moment a series of sensing elements 404 engage the inner surface 402 of the track, if a slip occurs, that slip will register on each one of the sensing elements 404 that is in contact with the track 16. If an angular displacement is reported by a series of the sensing elements 404, and that angular displacement generally has the same magnitude, then the occurrence of a slip can be more conclusively established. On the other hand, if only one of the sensing elements 404 reports an angular displacement, but no other sensing element 404 reports an angular displacement, then a slip is unlikely to have occurred.

In addition to the occurrence of slippage between the peripheral surface 400 of the sprocket and the inner surface 402 of the track 16, the drive mode sensor can also measure the degree of slip which is related to the degree of angular displacement of the individual sensing elements 404.

Figure 4B:
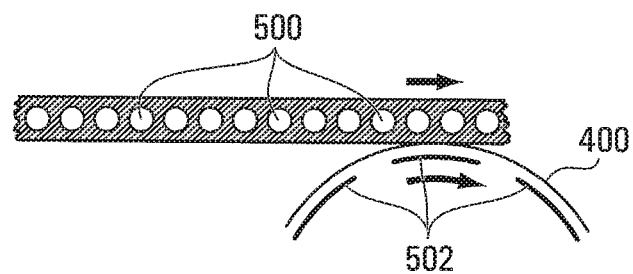
FIG. 4B is a fragmentary side view of a sprocket and a track illustrating a drive mode sensor according to a variant.

In a possible variant, the drive mode sensor is a non-contact sensor. One possibility of implementing a non-contact sensor is shown in FIG. 4B. The drive mode sensor includes a series of permanent magnets placed at equally spaced intervals along the track. Induction coils 502 are placed near the periphery 400 of the sprocket. A detection circuit, not shown measures the output of each induction coil 502. If there is any slip, the signal pattern produced by the respective induction coils 502 will change which can be sensed. As in the case of the previous embodiment, the output signal of the individual induction coils 502 can be communicated over a wireless link to a receiver.

Yet another possible variant of the drive mode sensor (not shown in the drawings) can also be considered, which uses an optical detector. This drive mode sensor variant uses marks on the track and on the sprocket 60, 64 that can be read optically, in order to determine of there is any slippage. Slippage is sensed when there is a phase shift between pulse trains output by the optical reader associated with the sprocket and the optical reader associated with the track. Specifically, the side edge of the track is provided with a series of marks which can be bars, dots or any other trace or impression which can be sensed when it passes by an optical reader. The reader can include an optical source, such as a laser beam and a receiver which senses the reflection of the beam over the surface of the track. Since the marks disturb the beam reflection, this disturbance can be used to detect the passage of individual marks. The same arrangement is provided on the sprocket, namely a series of marks on the surface of the sprocket which are read by an optical reader. When there is no slippage, each optical reader produces a pulse train and the pulse trains associated with the track and with the sprocket 60, 64 are in a generally static phase relationship. If slippage arises, the phase relationship will change.

Figure 7:
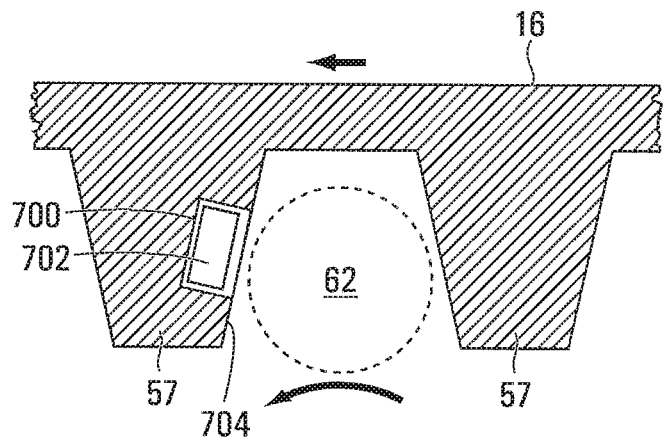
FIG. 7 is an enlarged side view of a track illustrating the location of a strain sensor in a drive lug.

Yet another possibility to determine the drive mode is to use a strain sensor in the individual drive lugs 57 or in any other suitable location of the track 16. Each drive lug 57 or only some of the drive lugs 57 can be provided with strain sensors to detect the force applied on the drive lugs 57 by the sprocket 60, 64. An example of a strain sensor is a load cell that can measure force applied to the drive lug 57. When the track is in the friction drive mode, little or no force will be applied on the drive lugs 57. In contrast, when the track 16 transitions to the positive drive mode, the force acting on the drive lugs 57 will substantially increase. The strain sensor can be any type of sensor suitable to provide a force reading when load is applied on one of the faces of the drive lug 57, the one that is engaged by a pin 62. Accordingly, as the pin 62 presses on the face of the drive lug 57, the force is sensed by the strain sensor and an output signal is generated. FIG. 7 illustrates a possible example of implementation of a drive lug 57 in which is mounted a strain sensor. To this end, the drive lug 57 can be designed with a suitable cavity 700 in which the strain sensor 702 can be located. The strain sensor 702 has a sensing part that is adjacent the face 704 of the drive lug 57 which is engaged by the pin 62. A suitable power source, such as a battery, a piezo-electric element or an induction antenna can power the strain sensor 702 and it is provided with a transmitter to wirelessly report the force to a receiver mounted on the undercarriage or at any other suitable location on the vehicle 10.

Advantageously, when multiple strain sensors are provided on the track 16, each strain sensor being mounted to a respective drive lug, each strain sensor is uniquely identified such that its force reading can be distinguished from force readings of other strain sensors. Digitally encoding the force reported by the strain sensor and appending to the force value a unique identifier can accomplish this. In this fashion, the receiver and the data processing unit that performs the analysis of the force values reported by the strain sensors can associate received force values to respective drive lugs.

Figure 8:
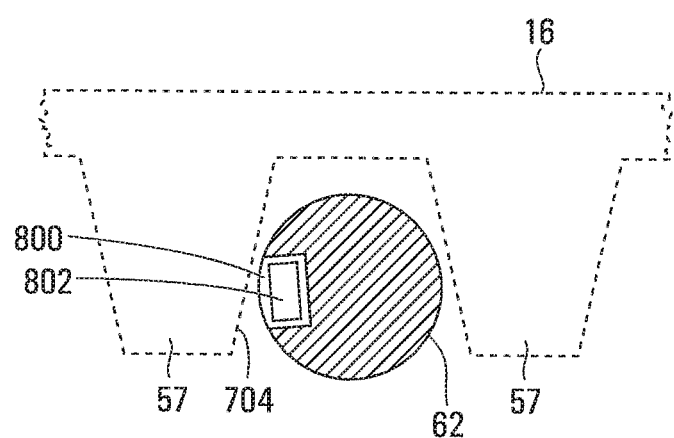
FIG. 8 is an enlarged cross sectional view of a sprocket bar illustrating the location of a strain sensor.

In an alternative embodiment shown in FIG. 8, the strain sensors, such as load cells, can be mounted to the sprocket, instead of being mounted to the drive lugs 57. In this fashion, the track 16 has no drive mode sensing capability. The strain sensors are mounted on the sprocket at locations that engage the drive lugs 57. In the examples of the sprockets described earlier, this would be the bars 62. The bars are provided with cavities 800 in which the strain sensors 802 are mounted such that when the bars 62 engage the drive lugs 57, force registers on the strain sensors.

An advantage of the drive mode sensor that senses strain to determine the drive mode over the drive mode sensor that detects slip is the ability to sense when the track transitions back from the positive drive mode to the friction drive mode or, more generally when the loading applied to the track is no longer sufficient to overcome the friction between the track and the sprocket.

A receiver (not shown) mounted on a suitable location on the vehicle 10 picks up the output of the drive mode sensor. The output is a signal reporting slip or force. The signal is processed by a data processing device that will determine the drive mode of the track and will then generate a control signal to perform a control function.

Yet another possible way of implementing a drive mode sensor is to use an indirect approach instead of a direct measuring technique. For example, a torque sensor can be provided in the power train that determines the amount of torque that is being applied on the sprocket 60, 64. Since the torque applied on the sprocket 60, 64 is directly related to the drive mode of the track 16, then by reading the torque it is possible to infer whether the track 16 is the friction drive mode or in the positive drive mode. Note that in this example, the drive mode determination is not being directly measured and it is based on a theoretical drive mode transition value at which the transition between the friction drive mode and the positive drive mode is known to occur.

A variant of the drive mode sensor which operates indirectly determines the drive mode by observing the operational condition of the engine of the vehicle 10 and derives the amount of power, hence torque that is being produced. In this method of implementation the drive mode sensor uses a computer implemented engine parameters map that correlate engine parameters to torque produced by the engine. Possible engine parameters include RPM, throttle opening percentage, intake manifold pressure, amount of fuel being injected, temperature and ignition timing among others. Accordingly, the system can infer the torque generated at any given moment by searching the map on the basis of the current engine parameters to identify the corresponding torque value. Once the torque produced by the engine is known, the torque value applied on the sprocket 60, 64 can be derived on the basis of the gear ratio that is being used to transmit the drive power from the engine to the sprocket 60, 64.

Figure 5:
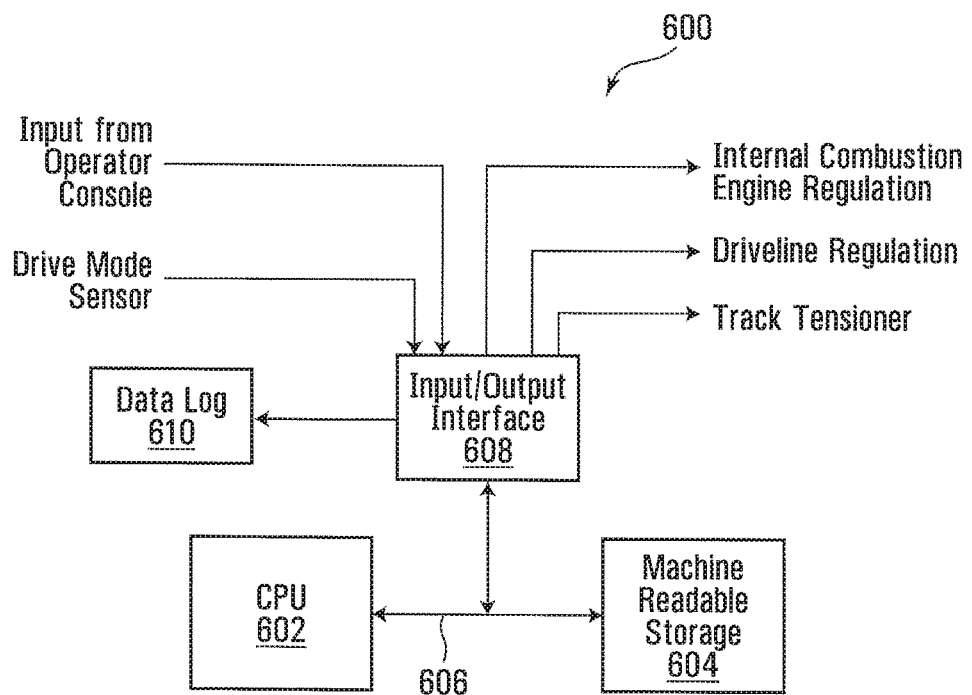
FIG. 5 is block diagram of a computing platform for generating control signals to regulate the mode of operation of the track.

FIG. 5 illustrates a block diagram of a non-limiting example of implementation of a data processing device 600. The data processing device 600 is a computing platform having a CPU 602 that communicates with a machine-readable storage device 604 over a data bus 606. An input/output interface 608 connects to the data bus 606. Input signals that convey data to be processed by the data processing device 600 are received at the input/output interface 608. Similarly, output signals directed to components of the vehicle 10 which are controlled by the data processing device 600 also transit via the input/output interface 608.

The machine-readable storage medium 604 is encoded with software that is executed by the CPU 602. The software performs the processing of the inputs signals and generates output control signals on the basis of a control strategy.

The input signals that are applied to the input/output interface 608, include:
1. The output of the drive mode sensor. As discussed previously, the drive mode sensor can report the occurrence and/or degree of slip between the sprocket 60, 64 and the track 16. Alternatively, the drive mode sensor can report the force acting on the drive lugs 57 or acting on the sprocket components that engage the drive lugs 57. The signal stream, in addition to conveying slip and/or force can also convey the identifier of the respective sensor that has generated the data. The drive mode sensor can also report torque information. In one example the torque information is provided by a torque sensor indicating the torque acting on the sprocket 60, 64 and that is in turn acting on the track 16. The degree of torque applied on the sprocket 60, 64 determines to a large degree the drive mode of the track 16. In this instance, the torque value can be used in a feedback control loop that regulates the operation of the engine, for in turn controlling the drive mode of the track 16. Note that the torque sensor can output torque information which is not directly measured but is derived by correlating the engine parameters to the torque value, as discussed above.

2. Output from operator console. This signal is generated in response actuation of a control by the operator. The control may be a mechanical control such as lever or button or may be an electronic control. The control conveys a command to the data processing device 600 to control the vehicle in a predetermined fashion, by using as an input the drive mode sensor. Examples of possible control include:

a. Keep the vehicle at all times in the friction drive mode. This is suitable for light duty operations where the engine and/or drive train are managed such that the track remains in the friction drive avoiding or limiting transitions to positive drive mode.

b. Keep the vehicle as much as possible in the positive drive mode and use the friction drive mode as an assist. In this example, the vehicle is in the positive drive mode all the time, which is accomplished by operating the hydraulic track tensioning system at a relatively low pressure. A low pressure reduces significantly the force pressing the track against the smooth surfaces of the sprocket 60, 64 thus reducing the friction between them. As such, when the vehicle starts moving or operates at low power loadings, the force applied on the track by the tensioning system is low which practically negates the friction drive mode. At higher power loadings, however, the force is applied to the drive lugs 57 is significant, the friction drive mode is invoked as an assist to the positive drive mode. This is accomplished by increasing the hydraulic pressure in the track tensioning mechanism to increase the track tension and consequently the force urging the track against the smooth surfaces of the sprocket 60, 64. In this fashion, the vehicle operates by using both drive modes, positive drive with friction drive assist. The friction drive assist can pass some component of the power loading to the track that would otherwise be passed through the drive lugs 57. Accordingly the amount of stress the drive lugs 57 experience is reduced by at least some degree. The degree of the friction drive assist can be tailored by varying the hydraulic pressure in the track tensioning system; the higher the pressure the higher the friction drive assist will be. There are limits to the possible increase of the hydraulic pressure but the track tensioning system is usually designed to support a certain range of pressures which allows dynamically varying the hydraulic pressure within that range in order to dynamically vary the extent of the friction drive assist according to the operational conditions of the vehicle. A side benefit of using the friction drive assist, that is invoked only when needed, is the reduced wear on the components of the undercarriage, such as bearings, mid-rollers of idler wheels. When the track 16 is run most of the time in the positive drive mode, the hydraulic pressure in the track tensioning system is kept relatively low in order to negate the friction drive mode or to reduce it; the loading that the track exerts on those mechanical components is consequently reduced. Accordingly, those components may not need to be replaced or repaired as often as under an arrangement where the tension in the track is maintained consistently at a higher level.

c. Control the transition between the friction drive mode and the positive drive mode, such as by "smoothing" the torque application on the sprocket 60, 64 to reduce the rate of force increase acting on the drive lugs 57 when the track 16 transitions from the friction drive mode to the positive drive mode.

The output signals that are released by the input/output interface 608 are as follows:

1. Internal combustion engine regulation. One or a set of control signals to regulate the operation of the internal combustion engine such as to control the torque that is being supplied to the sprocket 60, 64 driving the track. The control can be such as to regulate the amount of power produced by the engine (such as for example regulating the throttle opening, the RPM, the ignition timing, rate of fuel injection) to control the torque produced by the engine.

2. Driveline regulation. "Driveline" is considered to be the mechanism that transmits power from the engine to tracks of the vehicle. Controls the operation of the driveline to reduce the occurrence of torque spikes that may produce stress in the drive lugs 57. The control may involve modulating a clutch such as to limit the amount of torque being applied to the sprocket 60, 64.

3. Track tensioner. This output signal regulates the amount of hydraulic pressure applied by the hydraulic tensioner to the track 16. The pressure can controlled in any suitable way, such as by controlling the pressure of the hydraulic pump.

The information that is received by the various inputs of the data processing module 600, in particular the input from the operator console and the drive mode sensor is processed by software stored in the machine readable storage 604 in order to generate control signals that will manage the drive mode of the track 16. The logic built in the software determines the control strategy that will be implemented. Several different control strategies can be considered examples of which will be discussed below:

Maintaining the Track in the Friction Drive Mode

Figure 6:
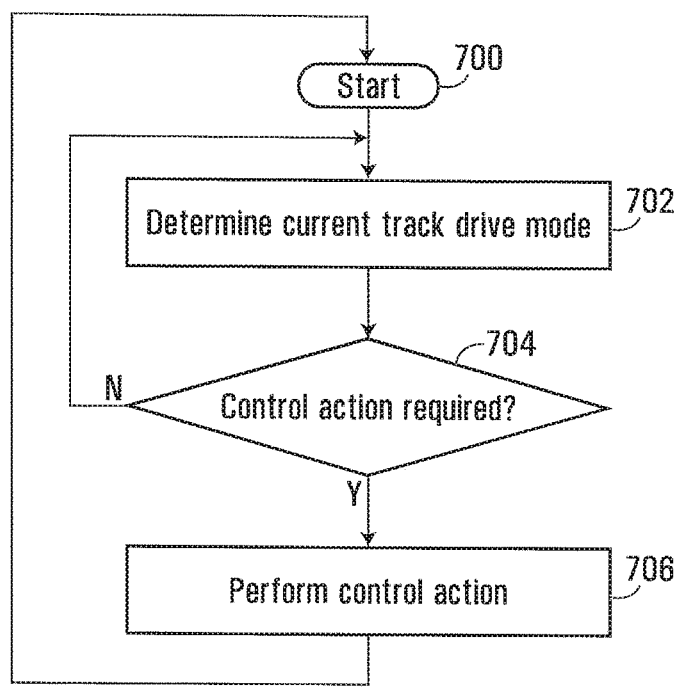
FIG. 6 is a flowchart of a process for managing the track drive mode of a vehicle.

This particular control strategy can be implemented as a result of a command input by the operator which is conveyed by the control signal sent to the input/output interface 608 of the data processing module 600 or it may be triggered in any other way. The purpose of the control strategy is to regulate the operation of the track 16 such as to avoid that the track 16 transitions to the positive drive mode, or at least delay this transition. FIG. 6 is a flowchart of a specific example of implementation of this control strategy. The process starts at step 700. At step 702, the data processing module 600 will determine the current drive mode of the track. This can be done by reading the output of the drive mode sensor. The drive mode sensor, whether it senses slip, force acting on the drive lugs 57 or provides torque information, generates a real time indication of the track drive mode.

Note that the output of the drive mode sensor may require preprocessing by the data processing module 600 before the system concludes that the track is in any particular drive mode or a transition between drive modes is occurring. For example, when several sensors are placed on the track or on the sprocket 60, 64, the pre-processing operation would correlate the readings of the different sensors for more accuracy. A slip sensor of the type illustrated at FIGS. 4a and 4b will report a slip event as a set of concurrent multiple outputs from a number of sensing elements 404, 502, not merely one. Accordingly, if multiple angular displacement readings are concurrently observed, then the logic concludes that a slip has occurred. In contrast, if only one of the sensing elements 404, 502 reports an angular displacement and the adjacent sensing elements 404, 502 do not report angular displacement then the logic concludes that a signal artifact is present and disregards the output. When a strain sensor is used, either on the track 16 or in the sprocket 60, 64, the logic considers the number of the drive lugs 57 on which force above a certain threshold is being applied before concluding that the track is in the traction drive mode. If the signal shows that force above the threshold that signals the transition to the positive drive mode is being applied on a series of drive lugs, especially when the drive lugs in the series are adjacent, then the logic concludes that the track 16 is in the positive drive mode. A series of adjacent drive lugs reporting force is consistent with the normal force distribution profile on the track 16 where the drive force applied by the sprocket 60, 64 at any given time is applied only at the drive lugs 57 that mesh with the sprocket 60, 64. On the other hand, if the drive mode sensor reports force above the set threshold on only one drive lug 57, the logic assumes a signal artifact. The force at which the transition is considered to occur is a value than can be set as a parameter in the software being executed by the data processing unit 600. That parameter may be programmable depending on the specific vehicle and the specific track being used. In order to determine the track drive mode, the logic compares the force that is being reported against the transition level. If the transition level is higher than the force currently applied then the track is likely in the friction drive mode. Otherwise the track is in the positive drive mode.

Different types of information may be derived from the output produced by the drive mode sensor, depending on the nature of the sensor that is being used. If the drive mode sensor senses slip, the indication is generally unidirectional in the sense that the indication of slip shows a transition between the friction drive mode to the positive drive mode, but not the reverse. If the drive mode of the track 16 changes again and there is a transition back to the friction drive mode the slip sensor is not likely to detect it since the track 16 will not slip back on the sprocket 60, 64. In contrast, a drive mode sensor that senses force applied at the interface drive lug/sprocket will show the transition from the friction drive mode to the positive drive mode and also the transition between from the positive drive mode back to the friction drive mode.

Step 704 is executed after the logic has established the drive mode of the track. Step 704 is a conditional step and determines if a positive action is required in order to maintain the track in the friction drive mode. The conditional step will be answered in the negative if the drive mode sensor reports that the track is in the friction drive mode. In contrast, when the drive mode sensor reports that the track drive mode is in the positive drive mode the step 704 will be answered in the affirmative. Note that as long as the conditional step 704 is answered in the negative the processing returns back to step 702 where the drive mode of the track is observed again. The logic remains in this continuous loop as long as the track drive mode remains in the friction drive mode.

If eventually, the conditional step 704 is answered in the affirmative, then the processing moves to step 706 where a control action is performed. In this specific example of implementation, the purpose of the control action is to prevent the track 16 from transitioning to in any significant way to the positive drive mode. For instance, if a transition to the positive drive mode has momentarily occurred, the action will be such that the drive mode will revert to the friction drive mode. Several control actions can be implemented, either individually or in combination. Examples of those actions are described below:

i. Manage the torque that is applied on the sprocket 60, 64 driving the track 16. The management may include limiting the value of the torque to a level that such as to prevent the transition to the positive drive mode. In other words, at all times the torque value applied by the drive train to the sprocket 60, 64 is not allowed to exceed a certain limit. Objectively, in this operational condition the vehicle 10 may no longer be suitable for tasks that require a high power loading on the track 16, such as travel at high speeds, steep climbs or carrying heavy loads where the torque that is required would cause the track 16 to transition into the positive drive mode. However, there may be some light duty applications where the maximal torque value would suffice and where otherwise, an overly aggressive power application by the operator may in fact cause the track to transition unnecessarily to the positive drive mode from time to time.

In this example, the control action performed at step 700 supersedes operator throttle inputs. If the operator provides an aggressive throttle input, which commands for the engine to significantly increase the torque on the sprocket 60, 64, the control action 700 will condition the input such that the actual demands on the engine will be consistent with the control strategy that the system is enforcing.

The actual control of the torque is effected by regulating the operational parameters of the engine of the vehicle. In the case of a diesel engine, the operational parameters include a regulation of the amount of diesel fuel injected; the higher the amount of fuel the larger the power output. Accordingly, the control action step 706 regulates the engine output in order to keep the torque produced below a certain level. The control action on the engine can be done with or without real time feedback information. Real time feedback information can be obtained from two different sources (a) the drive mode sensor and/or (b) a dedicated torque sensor.

a. Feedback information from the drive mode sensor— When the drive mode sensor is strain based, the force acting on the drive lugs 57 provide a real time indication on the drive mode of the track. The logic then acts on the internal combustion engine to regulate the torque such that the force acting on the drive lugs 57 remains less than the value that indicates a transition to the positive drive mode, or to keep the rate of force increase on the drive lugs 57 below the selected level.

b. Feedback information from a dedicated torque sensor—a torque sensor in the drive line of the vehicle can be used to provide operational control owing to the relationship between the torque applied on the sprocket 60, 64 and the drive mode of the track 16. Thus, the logic in the data processing module 600 relies on real time torque feedback information to manage the torque that is being applied to the track 16. In order to establish the torque value at which the drive mode transition takes place the logic of the software that is being executed by the data processing module 600 may be programmed to "learn" the critical torque value at which the transition will occur by first observing the output of the drive mode sensor and correlating that output with the output of the torque sensor. When the logic observes a transition it records the torque value at which the transition is observed and that torque value is then used as a limit to be enforced. This approach would work with a drive mode sensor that works on the basis of slip; the occurrence of the slip indicating a drive mode transition. The torque management can thus be performed on the basis of the torque sensor output that is being supplied to the data processing device 600. The logic will continuously read the torque sensor output and regulate the engine parameters, as discussed above in order to keep the torque being applied to the sprocket 60, 64 below the selected value or to limit.

In another possible implementation, only a torque sensor is being used in the drive line of the vehicle, which provides real time torque feedback information and also acts as a drive mode sensor. Since the drive mode transition is related to the torque that is being applied on the sprocket 60, 64 it is possible to deduce that a drive mode transition is occurring when the torque output reading is near or at the nominal torque value at which the transition is expected or known to occur. On that basis the torque management can be made.

Yet, in another possible embodiment, torque management can be made without any drive mode sensor and without a dedicated torque sensor that directly measures torque for feedback information. In this case, the logic on the data processing device 600 is provided with a data map, as discussed earlier that infers the torque output to engine parameters, such as amount of fuel injected, Revolutions Per Minute (RPM) and others. In order to keep the torque at a certain level, the logic selects the engine parameters according to this map such that the operation will not exceed the desired torque value, which is the value known to correspond to a mode transition. This mode of operation is based on the assumption that the engine operation closely follows its nominal values on the basis of which the map has been derived.

ii. Regulating the tensioning system 44 in order to increase/decrease the tension in the track. The drive mode of the track is determined by a number of factors, one of them being the degree of tension in the track. Generally, the higher the tension, the longer the track will remain in the friction drive mode. In the specific example of implementation, the tensioning system has a hydraulic ram with a piston 34 that can be extended or retracted to displace the wheel 32 and thus increase or decrease the tension in the track 16. Accordingly the hydraulic pressure acting on the piston 34 is functionally related to the tension in the track 16; the higher the hydraulic pressure, the higher the tension in the track 16 will be. Several specific examples of track tensioning strategy can be considered, as discussed below in order to maintain the track in the friction drive mode. Note that this strategy can be implemented while the vehicle is in motion. It is not necessary to stop the vehicle in order to adjust the track tension.

1. When the friction drive mode is selected, say at the operator console, increase the track tension by a predetermined degree. For example, tracked vehicles can operate at hydraulic pressures in the range of 1000 psi to 25,000 psi. A typical vehicle, without a dynamic track tension adjusting system normally operates at a hydraulic pressure set in the area of 3,000 psi, while an industrial vehicle operates in an area of 6,000 psi. when a dynamic track tension is used, a possibility is to set the initial hydraulic pressure in the track tensioning system at around 6,000 to 8,000 psi and increase the pressure up to 25,000 psi in order to maintain the friction drive as long as possible. The hydraulic pressure is increased in response to a control signal issued by the data processing device 600. The hydraulic pressure may be dynamically varied on the basis of the output of the drive mode sensor. Alternatively, a control strategy may be used which increases the hydraulic pressure with the engine power that is being produced. In this form of implementation the data processing device 600 is not directly determining the transition between the friction drive mode and the positive drive mode. Rather the system increases the track tension as engine power increases such as to keep the track in the friction drive mode as much as possible. The relationship between engine power and the hydraulic pressure can vary. It can be linear, such that as the engine power increases, the track tension also increases in a linear fashion.

2. When the friction drive mode is selected increase the track tension momentarily when the track is near the transition point to the positive drive mode, such as to "shift" this transition point by increasing the friction between the track 16 and the sprocket 60, 64. In this example, the increase in the track tension is done by increasing the hydraulic pressure in the tensioning system when the torque acting on the sprocket 60, 64 is at a predetermined point from the torque transition value. When the torque acting on the sprocket 60, 64 is less than the predetermined point, the hydraulic pressure in the tensioning system is reduced. Accordingly, the hydraulic pressure in the tensioning system varies as the power loading on the track 16 increases.

iii. Regulating the tensioning system and managing the torque acting on the sprocket 60, 64 at the same time. Both of these actions can be combined to manage the operation of the track 16 such that it remains in the friction drive mode.

Managing the Transition Between the Friction Drive Mode and the Positive Drive Mode This particular control strategy does not try to keep the track 16 in the friction drive mode only; instead it manages the transition from the friction drive mode to the positive drive mode such that loading on the drive lugs 57 that occurs during the transition is controlled to some degree to avoid unnecessary "shocks" that may damage the drive lugs 57 over the long run. One possibility is to perform torque management, to control the rate of torque increase on the sprocket 60, 64 such that if the track transitions to the positive drive mode, the transition is made more gently thus limiting the strain "shock" acting on the drive lugs 57. In this example, the control action limits the torque increase over time to a certain rate which is considered to be acceptable or desirable. This maximal rate is a parameter that is programmable according to the specific vehicle and track used on the vehicle. The torque rate increase management is carried out according to the possibilities discussed earlier.

Maintaining the Track in the Positive Drive Mode.

This particular control strategy aims to maintain the track as much as possible in the positive drive mode, and uses the friction drive mode when the power loading on the track is significant in order to provide an assist function. This control strategy is implemented by regulating the track tension; the higher the tension the more significant the friction between the track and the sprocket is. In contrast, the lower the tension of the track the lower the friction.

During normal vehicle operation, when the power loading on the track does not exceed a certain threshold, the track tension is maintained sufficiently low such that the track operates as a practical matter in the positive drive mode. The track tension being maintained low has an advantage; the force acting on the various components of the undercarriage that support the track is reduced and as a consequence there is less wear on the system.

When an operational condition is reached at which the friction assist is to be invoked, data processing device 600 issues a control signal to direct the track tensioning system to increase pressure. In a specific example of implementation, the amount or degree of friction drive assist can be related to the power loading on the track. At a certain power loading threshold, the friction drive assist is invoked by initiating an increase in the tensioning system hydraulic pressure. If the power loading further increases, the friction drive assist is also increased by augmenting the hydraulic pressure further. This increase may continue up to the maximal hydraulic pressure the tensioning system can provide. The relationship between the power loading and the track tension can be linear or non-linear and that relationship may hold for power loading increases or power loading decreases as well. In other words, when the power loading on the track diminishes so does the track tension.

In a specific and non-limiting example of implementation, the hydraulic pressure can be varied in the range from about 1000 psi to about 25,000 psi, more preferably in the range from about 3000 psi to about 25,000 psi and most preferably in the range from about 6,000 psi to about 25,000 psi.

Yet another possible form of implementation of the friction drive assist function is to provide a sprocket arrangement that has a contact interface with the track with controllable friction characteristics. For instance the surfaces 66, 68 of the sprocket can be arranged such as to be in rolling contact with the inside of the track. This is achieved by constructing the surfaces as two concentric rings, where the outer ring can freely pivot over the inner ring. The track rests on the outer ring. Since the outer ring can freely pivot on the inner ring, the track is, for all practical purposes in rolling contact with that ring. This means the sprocket can only drive the track via the positive drive mode since the rolling contact precludes friction between the concentric rings arrangement and the inside surface of the track. By providing a suitable clutch system between the concentric rings, it is possible to control via the control signals discussed earlier the ability of the outer ring to freely turn on the inner ring. In this fashion, by engaging the clutches the outer ring is locked against rotation to the inner ring, thus precluding the rolling contact with the track. Accordingly, when the clutches are engaged, the outer surfaces 66, 68 provide a friction drive mode assist function.

The clutches are mounted to the sprocket and are actuated according to the desired friction characteristics. In a specific example the clutches have two friction surfaces mounted on respective rings; when the surfaces are disengaged the rings are free to rotate but when they are engaged the surfaces are no longer free to rotate and are locked to one another thus enabling the friction drive mode. The clutches can be actuated electrically and powered via a slip ring or any other suitable device. The reader will appreciate that instead of using clutches, other devices can be employed that can selectively lock the two rings to each other such as to preclude rotation.

The power loading on the track can be determined directly such as by reading the output of a strain sensor (in the track or in the sprocket) or by reading the output of a torque sensor. Also, the power loading can be determined indirectly on the basis of the specific set of operational conditions of the engine or even by reading the vehicle speed, vehicle weight and inclination (rate of grade that the vehicle is climbing) to compute the power loading that is being applied to the track.

The data processing device 600 which is used to manage the operation of the track 16 can also be used to collect data relating to the usage of the track 16. Referring back to FIG. 5, the data processing device 600 is further provided with a data log 608, which is a machine readable storage in which data relating to the usage of the track can be stored. Additionally, software can be provided in the machine readable storage 604 to process the information in the data log 608 to extract useful statistics or forecasts.

The data log can store the following information that is generated in the course of the operation of the data processing device 600;
  a. Number of hours the track 16 has operated in the friction drive mode;
  b. Number of hours the track 16 has operated in the (full) positive drive mode;
  c. Number of transitions between the friction drive mode and the positive drive mode;
  d. Profile of the strain applied on the drive lugs 57, such as the average strain while the track 16 has operated in the positive drive mode.

The information stored in the data log 608 can be used as such to provide useful knowledge about the track usage history. For example, this information can be used by the track manufacturer to decide whether a warranty would apply in any particular case. The information can be made available to a user by channeling it through the input/output interface 608 for display on the operator console or to be loaded on a service device reader that connects temporarily to the input/output interface 608.

The data in the data log 608 can be processed by software to provide indications to the operator that can help with extending the life of the track 16 or more generally better manage the track operation. In one possible example, the software is designed to count the different events that the track 16 has encountered and to compare them to predetermined values in order to compute:
  a. If the track 16 is due for an inspection. This can be computed on the basis of any suitable formula taking into account the track usage statistics. For instance, the manufacturer may have determined that a track inspection is needed after X number of total hours of operation when at least 50 percent of that time has been performed in the positive drive mode.
  b. Approximate life expectancy of the track 16, computed on the basis of the track usage pattern. For instance a track may be known to last at least Y hours of total usage which is to be discounted by 20% when the track has spent more than 50% of its use in the positive drive mode.

c. Relative "health" of the drive lugs 57, especially when a strain sensor is used to directly measure the force applied on the drive lugs 57 by the sprocket 60, 64. For instance if a drive lug 57 reports less strain than adjacent drive lugs 57, this may be an indication that the drive lug 57 is failing (the drive lug yields as a result of internal failure). In turn this information may be used as an indicator to replace the drive lug 57, if the track 16 is designed to use or accept replaceable drive lugs 57.

The information so computed can be displayed to the operator at his console either when that information is requested by the operator or automatically when certain events occur that may indicate the need for action, such as an indication of the need of an immediate inspection of when a drive lug may be failing.

The control actions discussed earlier may be performed concurrently on the both tracks of the vehicle or in a selective manner, such that the control action on one of the tracks is different from the control action acting on the other track.

The selective control action can be implemented by providing the vehicle with two independent control channels, where each control channel is associated with a respective track. Each control channel includes a dedicated data processing device 600 and associated sensors such as to handle the control function for each track independently. In this fashion, the vehicle has dual drive mode sensors one for each track, supplying information on the drive mode. The output of each drive mode sensor is processed independently and independent control signals are generated. For example, when the control strategy varies the track tension, the tension in each track is regulated independently. At any given moment, the tension in one track can be different from the tension in the other track. This approach allows a more precise control. For instance, if the control strategy is to maintain each track in the friction drive mode as much as possible, the tension in each track will be adjusted as per that particular track behavior.

Objectively, this approach would require two separate track tension mechanisms, where each mechanism can operate at a different hydraulic pressure. In addition, duplicate sensors would also be required. However, the overall effect is to provide the vehicle with a more precise track control system.

Note that some control strategies may not be fully independently implemented. For instance, a control strategy that regulates the power output of the engine would be the same for both tracks since a single engine drives both tracks. Independent control is possible at the drive line level, where the power application to each track can be individually adjusted. The driveline allows independent regulation of the power flow to each track, hence independent control strategies.

Figure 9:
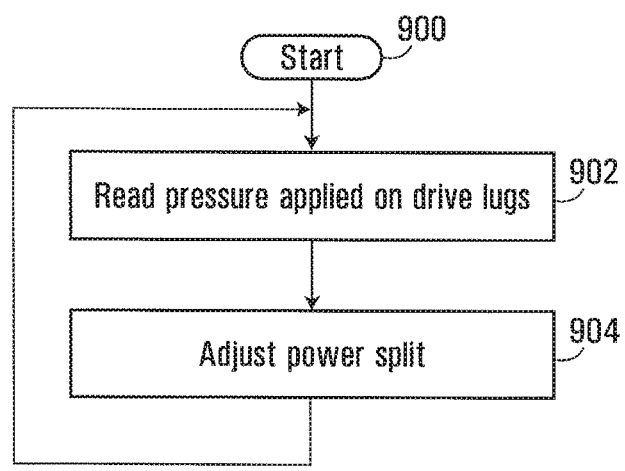
FIG. 9 is a flowchart of a process for controlling the power split between two tracks.

Note that the various sensors provided primarily to control the track drive mode can also be used for additional control functions. Referring in particular to the implementation that measures the strain at the interface drive lugs 57/bars 62, those outputs can be used to control the traction control system of the vehicle. This is illustrated in the flowchart of FIG. 9. The process starts at step 900. At step 902 the data processing device 600 reads the strain acting on the drive lugs 57 of each track. If the strain acting on the drive lugs 57 of each track is the same, this means that both tracks are not slipping on the ground. No control action is therefore necessary. However, if the strain is significantly different, this implies that one track is slipping. In this case the control action at step 904 is performed. The purpose of this control action is to adjust the power split such that the track that is slipping receives a less power than the one not slipping. This regulation is at the drive line level. The logic is run continuously such that at any given time the power split between the tracks can be altered to account for traction differences.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A track for traction of a vehicle, the track being elastomeric and mountable around a plurality of wheels to move about the wheels, the track comprising:
   a ground-engaging outer surface;
   an inner surface opposite to the ground-engaging outer surface; and
   a sensor.

2. The track of claim 1, wherein the sensor is disposed within elastomeric material of the track.

3. The track of claim 1, wherein: the track comprises a plurality of projections projecting from the ground-engaging outer surface and the inner surface; and at least part of the sensor is located between the ground-engaging outer surface and the inner surface.

4. The track of claim 1, wherein: the track comprises a plurality of projections projecting from the ground-engaging outer surface and the inner surface; and at least part of the sensor is located in a given one of the projections.

5. The track of claim 4, wherein: the projections include traction projections projecting from the ground-engaging outer surface and wheel-contacting projections projecting from the inner surface; and the given one of the projections is a given one of the wheel-contacting projections.

6. The track of claim 5, wherein: the wheels include a drive wheel for driving the track; the wheel-contacting projections include drive projections configured to engage the drive wheel; and the given one of the wheel-contacting projections is a given one of the drive projections.

7. The track of claim 1, wherein: the wheels include a drive wheel for driving the track; and the sensor is configured to sense an interaction between the track and the drive wheel.

8. The track of claim 7, wherein the interaction between the track and the drive wheel is slippage between the track and the drive wheel.

9. The track of claim 7, wherein the interaction between the track and the drive wheel is a force between the track and the drive wheel.

10. The track of claim 1, wherein the sensor is a wireless sensor.

11. The track of claim 1, wherein the sensor is an optical sensor.

12. The track of claim 1, wherein the sensor is a strain sensor.

13. The track of claim 1, wherein the sensor comprises a wireless transmitter configured to wirelessly transmit a signal.

14. The track of claim 1, wherein the sensor is configured to output a signal processable by a processing apparatus to perform an action related to the vehicle.

15. The track of claim 14, wherein the action related to the vehicle is an action controlling the vehicle.

16. The track of claim 15, wherein the action controlling the vehicle is an action controlling a tracked undercarriage of the vehicle that includes the track and the wheels.

17. The track of claim 16, wherein the action controlling the tracked undercarriage is an action controlling power applied to the tracked undercarriage.

18. The track of claim 17, wherein: the wheels comprise a drive wheel for driving the track; and the action controlling power applied to the tracked undercarriage is an action controlling power applied to the drive wheel.

19. The track of claim 16, wherein: the tracked undercarriage is configured to drive the track in a plurality of drive modes that includes a friction drive mode and a positive drive mode; and the action controlling the tracked undercarriage is an action controlling in which of the drive modes the track is driven.

20. The track of claim 16, wherein: the tracked undercarriage comprises a tensioner for tensioning the track; and the action controlling the tracked undercarriage is an action controlling the tensioner.

21. The track of claim 14, wherein: the signal is a sensor signal; and the action related to the vehicle is issuance of a control signal to a component of the vehicle to control the component of the vehicle.

22. The track of claim 21, wherein the component of the vehicle is a tracked undercarriage that includes the track and the wheels.

23. The track of claim 1, wherein the sensor is configured to output a signal processable by a processing apparatus to convey information to a user.

24. The track of claim 23, wherein the signal is processable by the processing apparatus to display the information to the user.

25. The track of claim 23, wherein the signal is processable by the processing apparatus to convey the information to the user on a console of the vehicle.

26. The track of claim 23, wherein the signal is processable by the processing apparatus to convey the information to the user on a device distinct from a console of the vehicle.

27. The track of claim 23, wherein the information to the user is conveyed automatically in response to an event.

28. The track of claim 27, wherein the event is indicative of potential failure of part of the track.

29. The track of claim 1, wherein the sensor is configured to output a signal processable to generate information regarding the track.

30. The track of claim 29, wherein the information regarding the track comprises information regarding usage of the track.

31. The track of claim 30, wherein the information regarding usage of the track comprises information regarding a period of time that the track has been used.

32. The track of claim 29, wherein the information regarding the track is directed to a manufacturer of at least one of the track and the vehicle.

33. The track of claim 32, wherein the information regarding the track is useful in considering a warranty of the track.

34. The track of claim 1, wherein the sensor comprises a piezoelectric element.

35. The track of claim 34, wherein the piezoelectric element is configured to power the sensor.

36. The track of claim 1, wherein the sensor comprises an induction antenna to power the sensor.

37. The track of claim 1, wherein the sensor is a first sensor and the track comprises a second sensor.

38. A tracked undercarriage for traction of a vehicle, the tracked undercarriage comprising a plurality of wheels and the track of claim 1.

39. A vehicle comprising the track of claim 1.

40. An apparatus for use in respect of a vehicle comprising a track for traction of the vehicle, the track being elastomeric and mounted around a plurality of wheels to move about the wheels, the track comprising a ground-engaging outer surface, an inner surface opposite to the ground-engaging outer surface, and a sensor, the apparatus comprising:
  a receiver to receive a signal output by the sensor; and
  a processing device configured to perform an action based on the signal output by the sensor.

41. The apparatus of claim 40, wherein the action is to control the vehicle.

42. The apparatus of claim 40, wherein the action is to convey information to a user.

43. The apparatus of claim 40, wherein the action is to convey information regarding the track.

44. A machine-readable storage medium storing software for use in respect of a vehicle comprising a track for traction of the vehicle, the track being elastomeric and mounted around a plurality of wheels to move about the wheels, the track comprising a ground-engaging outer surface, an inner surface opposite to the ground-engaging outer surface, and a sensor, wherein the software, when executed by a processing entity, causes the processing entity to:
  receive data derived from the sensor of the track; and
  perform an action based on the data derived from the sensor.

45. The machine-readable storage medium of claim 44, wherein the action is to control the vehicle.

46. The machine-readable storage medium of claim 44, wherein the action is to convey information to a user.

47. The machine-readable storage medium of claim 44, wherein the action is to convey information regarding the track.

48. A method for use in respect of a vehicle, the method comprising:
  providing a track for traction of the vehicle, the track being elastomeric and mounted around a plurality of wheels to move about the wheels, the track comprising a ground-engaging outer surface, an inner surface opposite to the ground-engaging outer surface, and a sensor; and
  causing an action related to the vehicle to be performed based on a signal output by the sensor.

* * * * *